Figure 1:
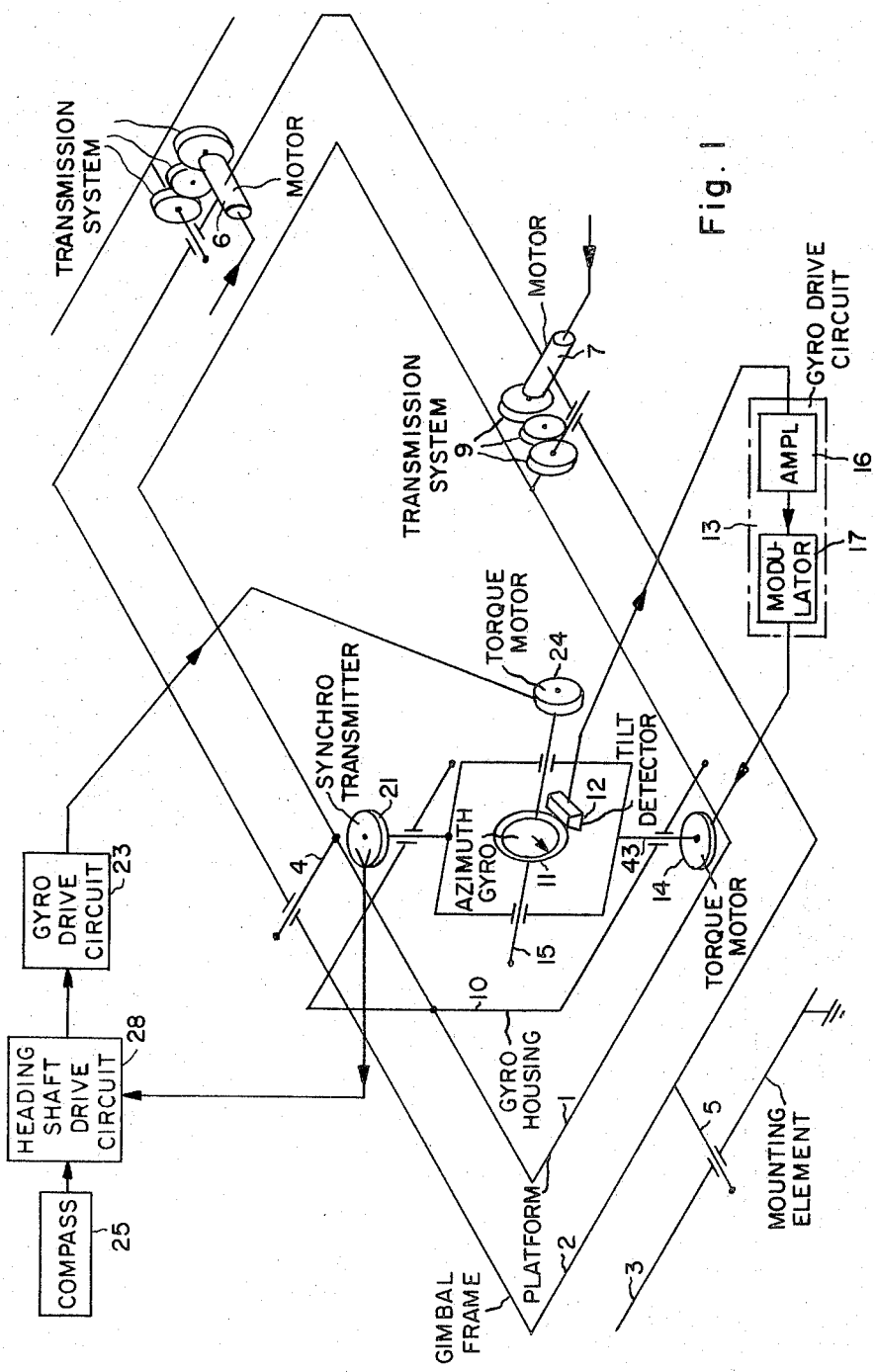

United States Patent [19]
Bos

[11] 3,849,895
[45] Nov. 26, 1974

[54] DEVICE FOR SMOOTHING A HEADING INDICATED BY A COMPASS

[75] Inventor: Johannes Bos, Hengelo, Netherlands

[73] Assignee: N.V. Hollandse Signaalappareten, Hengelo, Netherlands

[22] Filed: Dec. 9, 1971

[21] Appl. No.: 206,311

[30] Foreign Application Priority Data
Dec. 14, 1970 Netherlands...................... 7018173

[52] U.S. Cl............................................. 33/317 D
[51] Int. Cl............................................. G01c 19/36
[58] Field of Search...... 33/316, 317; 318/647, 648, 318/592, 593, 595

[56] References Cited
UNITED STATES PATENTS

| | | | |
|---|---|---|---|
| 2,520,922 | 9/1950 | Framme et al................. | 33/317 UX |
| 2,710,156 | 6/1955 | Stone.............................. | 33/317 X |
| 2,771,779 | 11/1956 | Schaffer et al................. | 33/317 UX |
| 2,887,782 | 5/1959 | Garwood........................ | 33/317 |
| 2,898,690 | 8/1959 | Colistra........................... | 33/317 |

FOREIGN PATENTS OR APPLICATIONS

| | | | |
|---|---|---|---|
| 900,933 | 7/1962 | Great Britain.................. | 33/317 |
| 1,058,755 | 2/1967 | Great Britain.................. | 33/317 |

*Primary Examiner*—William D. Martin, Jr.
*Attorney, Agent, or Firm*—Frank R. Trifari

[57] ABSTRACT

A smoothing system for a ship's heading indicated by a compass. The rotor of an azimuth (directional) gyro is in a cardanic suspension in a gyro housing mounted on a stabilized platform. During a run-up mode, a "heading shaft" is servo aligned directly with the compass position while the azimuth gyro is slaved to a position angularly related to the heading shaft. During a running mode, the servo error outputs are exchanged with each other so that the heading shaft is then slaved to the compass via the azimuth gyro.

6 Claims, 2 Drawing Figures

DEVICE FOR SMOOTHING A HEADING INDICATED BY A COMPASS

The invention relates to a smoothing system for a ship's heading sensed by a compass subject to fluctuations and indicated with the aid of an azimuth (directional) gyro. The gyro rotor is in a cardanic suspension in a gyro housing mounted on a stabilized platform. Since the compass should remain in a horizontal position but doesn't, cardan errors occur between the real position of the compass and the horizontal plane. These errors, which arise because the compass must absorb the ship's tilt movements in its own cardanic system, can be eliminated with the aid of the azimuth gyro. Although the azimuth gyro is also in a cardanic suspension, the cardanic system of this gyro does not influence the (stable) heading value indicated by said gyro because the azimuth gyro is on a stabilized platform.

A device as described in the opening paragraph, wherein the azimuth gyro is used for smoothing the heading fluctuations due to the above-mentioned cardan erros, is known.

However, before this smoothing process can take place, the position of the azimuth gyro must be aligned (run-up) to some extent — from a random position — with the azimuth position indicated by the compass.

The object of the invention is to provide a system, as described in the opening paragraph, whereby this run-up process as well as the above-mentioned smoothing process can be simply realized in one and the same system operating in various modes.

Due to the fact that the gyro must be aligned from a random position with the azimuth position determined by the compass, the run-up process may take an undesirable long time.

Another object of the invention is to prevent the run-up process from taking up too much time, or, more specifically, to prevent the gyro from rotating through an excessively large angle before the desired azimuth position is reached.

According to the invention the smoothing system for the ship's heading indicated by compass is hence provided with "a heading shaft," which is driven by a servo system.

In a run-up mode, the heading shaft is aligned with the compass. This occurs by means of a first differential device for measuring the difference between the shaft position and the compass position and a first servo system. Furthermore, during the run-up mode the azimuth gyro is brought to the closest one of the many stable azimuth positions. The stable azimuth positions correspond to the position of the heading shaft less an angular value of $(180°/n) \cdot 2k$ (where $k = 1, 2, \ldots, n$ are the various stable positions of a multipole synchro having $2n$ poles). This is accomplished with a second differential device which includes a multipole synchro transmitter coupled to a differential element for measuring the difference between the heading shaft position and the stable azimuth position that is closest to the random starting position of the gyro, followed up with a second servo system comprising a gyro drive circuit and a torque motor coupled to the gyro. The differential device for comparing the heading shaft and compass positions may include alternative coarse and fine differential elements for quickly bringing the shaft close to the compass position (course) and for accurate alignment with small offset (fine).

During the running mode, the first differential device is switched to then drive the second servo system while the second differential device is switched to then drive the first servo system. Thus, during the running mode the heading shaft is slaved to the compass via a smoothing azimuth gyro servo system.

A stabilized heading value is essential for example, to fire control problems, to obtain a "north-stabilized" display on PPI's, etc. Furthermore, it should be noted that, in order to obtain (for the platform stalization) a compensation voltage for the heading shaft which is proportional to the product of the heading change rate and ship speed, a a tacho generator can be simply provided.

Figure 2:
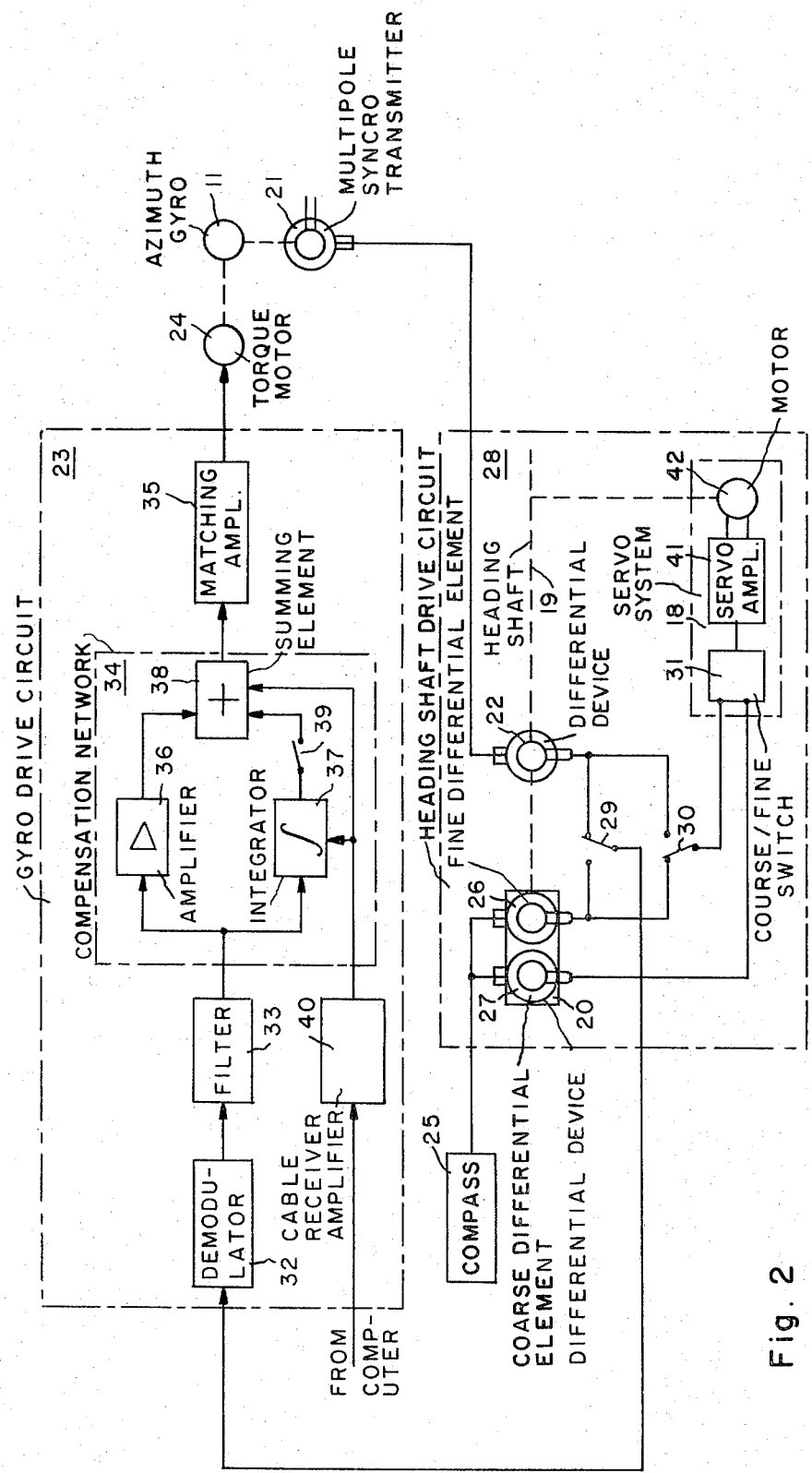

The invention will now be further explained with the aid of the figures, of which FIG. 1 shows a schematic representation of the smoothing system for the ship's heading indicated by a compass, while FIG. 2 illustrates in more detail a part of this system.

Like parts in both figures are denoted by like reference numerals.

The numeral 1 in FIG. 1 represents a platform to be stabilized. This platform is in a cardanic suspension by means of a gimbal frame 2 and two perpendicular axes 4 and 5, respectively. If the platform to be stabilized is on board a ship, then the gimbal frame 2 is bearing-mounted in a mounting element 3, which is fixed to the ship, through the axis 5, which is customarily parallel to the ship's fore-and-aft line.

The gimbal frame 2 carries two servo motors 6 and 7. Through intervention of the transmission systems 8 and 9 respectively, these servo motors, by correct activation, can tilt the platform 1 in such a way that this platform is held in a horizontal position (perpendicular to gravitational force).

Since the manner in which the platform is stabilized is of no direct importance in the smoothing process, a vertical reference gyro controlled by accelerometers is not shown in the figure and the way in which the servo motors are followed up through said vertical gyro is not discussed.

The platform 1 so stabilized is provided with a gyro housing 10, which contains an azimuth gyro 11 in a cardanic suspension. This gyro is stabilized about a horizontal axis 15 by means of a tilt detector 12, a gyro drive circuit 13 consisting of an amplifier 16 and a modulator 17, and a torque motor 14 coupled to the gyro. For the smoothing process it is sufficient, however, that the spin axis of the azimuth gyro be situated in an approximately horizontal plane. The azimuth gyro is controlled from a compass and functions as a smoothing device. That is, the fluctuations in the ship's heading value indicated by the compass due to the cardan errors in the compass are smoothed with the aid of the azimuth gyro.

However, prior to this smoothing process, the position of the azimuth gyro must be brought to some extent from a random position to a stabilizable position.

According to the invention, the smoothing system for the ship's heading indicated by a compass is provided (see FIG. 2) with a heading shaft 19 driven by a servo system 18, which, during a run-up mode is brought to a position corresponding with the direction indicated by the compass. This is accomplished by differential device 20 provided on the heading shaft 19 and by the servo system 18. Furthermore, during said run-up mode the azimuth gyro 11 is brought to the closest one of many stable azimuth positions. The stable azimuth positions correspond with the position of the heading shaft 19 less an angular value of $(180°/n) \cdot 2k$ (where $k = 1, 2, \ldots, n$ are the various stable positions of a multipole synchro having $2n$ poles). This is accomplished with a second differential device which includes a multipole synchro transmitter 21 responsive to the gyro position and a coupled differential element 22 responsive to the heading shaft position for measuring the difference between the heading shaft position and the stable azimuth gyro position that is closest to the random starting position of the azimuth gyro, followed up with a second servo system comprising a gyro drive circuit 23 driving a torque motor 24 coupled to the gyro 11.

During the running mode, the first differential device 20 is switched via switch 29 to then drive the second servo system (comprising gyro drive circuit 23 and torque motor 24) while the second differential device (comprising multipole synchro transmitter 21 and differential element 22) via switch 30 to then drive the first servo system 18. The azimuth 22) is switched is therefore manintained in the stable position in which it was placed during the run-up mode because it is now directly slaved to the compass while during run-up it was indirectly slaved to the compass via the heading shaft. That is, during run-up, the heading shaft is directly slaved to the compass and the gyro is directly slaved to the heading shaft, while in the running mode the gyro is directly slaved to the compass and the heading shaft is directly slaved to the gyro.

The numeral 28 in FIGS. 1 and 2 indicates the heading shaft drive unit formed by a portion of the heading shaft 19, the differential device 20 which comprises a fine differential element 16 and a course differential element 27, the differential element 22 and the servo system 18.

During the run-up mode which the device according to the invention can assume, the switches 29 and 30 are in the position as indicated in FIG. 2.

During this run-up mode two control voltages which respectively provide a coarse and a fine indication for the angular displacement between the position of the heading shaft 19 and the position corresponding to the direction indicated by the compass, are supplied to the servo system 18 by means of a coarse/fine transmission system. This system is formed by two synchro transmitters provided in the compass and the coarse and fine differential elements 26 and 27 on the heading shaft.

The servo system 18 is provided with a coarse/fine switch 31, through which, in case the position of the heading shaft 19 greatly deviates from the position corresponding with the direction indicated by the compass, the control voltage from the coarse differential element 27 is fed to the motor 42 via the servo amplifier 41, and through which, in case the position of the heading shaft 19 is approximately aligned with the direction corresponding with the direction indicated by the compass, the control voltage from the fine differential element 26 is fed to the motor 42 via the servo amplifier 41. Consequently, the motor 42 rotates the heading shaft in such a way that the control voltages fed through the differential elements 26 and 27 are reduced to zero. The heading shaft is then aligned with the position corresponding to the direction indicated by the compass.

During the run-up mode the azimuth gyro must also be placed into a stable azimuth position. For this purpose the rotor of a "multipole" synchro transmitter 21 is mechanically coupled to the gyro 11. The stator of this synchro transmitter is electrically connected with the fine differential element 22 on the heading shaft. The synchro transmitter 21 is so designed that, when an a.c. voltage is applied to the rotor windings and the multipole type stator makes one revolution, n electrical periods are supplied through the stator windings. Multipole synchros of this type are readily available commercially, for example from Bendix Corp. through its Eclipse - Pioneer Division under the name Autosyn synchros and are described in much more detail in U.S. Pat. No. 3,178,663. The Autosyn synchro has 22 poles, so $n = 11$. There are eleven stable displacement angles which may be represented by the term $(180°/n) \cdot 2k$ (where $k = 1, 2, \ldots, n$ represent the various stable modes with in this case $n = 11$). Hence, the control voltage supplied to the differential element 22 corresponds to an angular value of less than $180°/11 \cong 16.5°$. The latter angular value represents the maximum angular value through which the gyro would be rotated during the run-up phase. This rotation occurs by feeding the control voltage provided by the differential element 22 to the torque motor through the gyro drive circuit 23. The torsion exerted by the motor 24 rotates the gyro in such a way that the control voltage provided by the differential element 22 is reduced to zero. The position of the gyro is then aligned with a direction that is some multiple of 33° or $(360°/n)$ from the position of the heading shaft. Upon the expiration of a time to be predetermined, during which the azimuth gyro is aligned, from a random position, to the closest of $n$ stable positions, the switches 29 and 30 are set to the position which is not indicated. In this position the azimuth gyro is slaved to the compass 25, via the fine differential element 26, the gyro drive circuit 23 and the torque motor 24, and the heading shaft is slaved to the gyro 11, via the multipole synchro transmitter 21 and differential element 22.

The gyro drive circuit 23 is successively composed of a demodulator 32, a filter 33, a compensation network 34 and a matching amplifier 35. If a small change in the heading value occurs either by human intervention or by the yawing of the ship, the position of the heading shaft is kept aligned with the gyro position through the multipole synchro transmitter 21, differential element 22 and the servo system 18. If, in spite of this course change, the azimuth gyro and the compass were to remain aligned with respect to each other, the fine differential element 26 would not supply a voltage. However, owing to the course change, the position corresponding to the direction of the compass and the spin axis of the gyro deviate with respect to each other by an angular value, say $\theta_i$. Consequently, the fine differential element 26 provides a 400 Hz voltage whose magnitude corresponds to said deviation. This voltage which may be representd by $K_1 \cdot \theta_i$ (where $K_1$ is a constant), is fed successively to the modulator 32 and the filter 33. The purpose of this filter is to provide ample attenuation for the higher frequencies which, due to the cardan errors, are present in the signal supplied to the gyro drive circuit. Consequently a low-pass filter is chosen. The filter characteristic is such that the above-mentioned frequency components are attenuated by 30 dB/oct. In view of this filter characteristic the signal supplied by the filter is still $K_1\theta_i$. This signal is fed to the compensation network 34 which is composed of an amplifier 36, an integrator 37, and a summing element 38. A switch 39 is provided between the integrator and the summing element; however, this switch is closed when the stabilization system is in the running mode. If the transfer function of the compensation network is now given by $$a_1 + (a_2/s),$$

then the signal supplied by this network and fed to the matching amplifier 35 is represented by:

$$K_1\theta_i\,(a_1 + [a_2/s]).$$

Owing to the fact that the torque motor 24 is supplied with a 400 Hz voltage, the matching amplifier 35 functions as modulator. If $K_2$ represents the d.c. amplification of this modulator and $K_3$ the transfer function of the torque motor, the torque exerted on the gyro is expressed by:

$$K_1\theta_i\,(a_1 + [a_2/s])\,K_2K_3,$$

or $$C_1\,(1 + [C_2/s^\tau\,])\,\theta_i$$

where $C_1$ and $C_2$ are constants and $\tau$ the RC time of the integrator 37 pertaining to the compensation network. Since the transfer function of the gyro may be expressed by $C_3/s$, the angle through which the gyro is rotated is given by $$\theta_o = (1 + [C_2/s^\tau\,])\,(1/s^\tau_1\,)\,\theta_i,$$

where $\tau_1 = 1/C_1C_3$ represents the time constant of the erection loop formed by the gyro drive circuit 23 and the torque motor 24.

If it is now assumed that no spurious torques are exerted on the gyro the term $C_1\theta_i$ in the expression $$C_1\,(1 + [C_2/s^\tau\,])\,\theta_i$$

represents the torque that must be exerted on the gyro in order to bring the gyro again in the desired earth-fixed position.

If now an unbalance occurs in the gyro, for instance about the axis indicated in FIG. 1 by 15, then the resulting torsional unbalance produces motion of precession about the axis indicated by 43. In order to eliminate this ever-increasing angular displacement, an increasing torque should be exerted on the axis 15. To this effect an integration, which is proportional to the unbalance occurring in the gyro, is carried out on the control torque or on a value proportional to this, such as in the case considered on the demodulated and filtered signal from the heading shaft drive unit 28. Hence, the term $(C_1C_2/s^\tau\,)\,\theta_i$ in the last mentioned expression represents the unbalance compensation.

As regards the integration constants $\tau$ and $\tau_1$ it should be noted that $\tau/C_2 \gg \tau_1$ in order that the control determining the earth-fixed position is not too strongly influenced by the unbalance compensation.

The integrator 37 is designed in such a way that it has a diminished time constant $\tau$ if the input voltage of the integrator exceeds a certain value. This implies that, as long as the gyro position has not yet approached the desired position within a certain limit of accuracy, the unbalance compensation influences the control determining the earth-fixed position to a greater extent. The advantage of the diminished time constant is that the delayed effect of the unbalance compensation on the gyro control is reduced.

When the supply of compass information to the differential device 20 ceases, the azimuth drive control is switched into a "free-drift" mode. This is the case when the ship's heading is suddenly changed; then it appears to be necessary to prevent undesired accelerations from influencing the gyro.

Said switching can be realised by a computer (not indicated in the figures), which in response to signals indicating the course and the speed of the ship computes the centrifugal acceleration to which the ship is subjected and supplies a signal during the time the centrifugal acceleration exeeds a predetermined value. Said signal is supplied to the integrator 37 and the summing element 38 via the cable receiver/amplifier. The integrator and the summing element are both provided with a hold circuit. The output voltage of the integrator and the summing element is kept constant in the free-drift mode through these hold circuits.

Furthermore, it should be noted that the switch 39 between the integrator 37 and the summing element 38 is in the open (indicated) position during the run-up mode. During this mode an unbalance compensation, which would exercise a retarding influence on the gyro control, can be omitted. When switching from the run-up mode to the running mode upon the expiration of a time to be predetermined, the switch 39 is closed at the same time.

What we claim is:

1. A smoothing system for a heading indicated by a compass, comprising:
    a compass for sensing a heading direction;
    an azimuth gyro for holding an azimuth direction;
    a heading shaft for indicating a heading direction;
    a first differential device sensing the difference between the direction indicated by said heading shaft and the direction sensed by said compass;
    a second differential device sensing the difference between the azimuth direction held by said azimuth gyro and the closest one of a multiplicity of predetermined fixed directions relative to the direction indicated by said heading shaft;
    a smoothing azimuth gyro drive circuit normally responsive to the sensed difference from said first differential device for altering the azimuth direction held by said azimuth gyro in the direction which tends to reduce the sensed difference from said first differential device, but during run-up responsive instead to the sensed difference from said second differential device for altering the azimuth direction held by said azimuth gyro in the direction which tends to reduce the sensed difference from said second differential device; and
    a heading shaft drive circuit normally responsive to the sensed difference from said second differential device for altering the heading direction indicated by said heading shaft in the direction which tends to reduce the sensed difference from said second differential device, but during run-up responsive instead to the sensed difference from said first differential device for altering the heading direction indicated by said heading shaft in the direction which tends to reduce the sensed difference from said first differential device, whereby during run-up, the direction indicated by said heading shaft is directly slaved to the heading direction sensed by said compass and the azimuth direction held by said azimuth gyro is directly slaved to the closest of a multiplicity of predetermined directions established relative to the direction indicated by said heading shaft, but thereafter said heading shaft is indirectly slaved to the heading direction sensed by said compass via the azimuth gyro and smoothing azimuth gyro drive circuit, thereby yielding a heading indicated by said heading shaft which is also smoothed.

2. A smoothing system as defined in claim 1 wherein said second differential device includes a multipole synchro transmitter.

3. A smoothing system as defined in claim 2 wherein said multipole synchro transmitter is connected between said azimuth gyro and a differential element to establish and maintain a substantially constant difference between the direction indicated by said heading shaft and the direction held by said azimuth gyro.

4. A smoothing system as defined in claim 3 wherein said first differential device includes a coarse and a fine differential element which may be alternatively selected during run-up to reduce respectively great and small differences between the direction indicated by said heading shaft and the direction sensed by said compass.

5. A smoothing system as defined in claim 4 wherein said smoothing azimuth gyro drive circuit includes a compensation network for normally smoothing the sensed difference from said first differential device, said network comprising an amplifier normally responsive to the sensed difference from aid first differential device but during run-up responsive instead to the sensed difference from said second differential device, an integrator normally responsive to the sensed difference from said first differential device, and a summing element responsive to said amplifier and said integrator for altering the azimuth direction held by said azimuth gyro.

6. A smoothing system as defined in claim 5 wherein said integrator is disconnected during run-up to more rapidly bring said azimuth gyro to a stabilized position.

* * * * *

UNITED STATES PATENT AND TRADEMARK OFFICE
CERTIFICATE OF CORRECTION

PATENT NO. : 3,849,895
DATED : November 26, 1974
INVENTOR(S) : Johannes Bos

It is certified that error appears in the above-identified patent and that said Letters Patent are hereby corrected as shown below:

Column 1, line 66, "(course)" should be --(coarse)--

Column 3, line 24, after "element 22)" --is switched-- should be inserted
       line 25, "22) is switched" should be --gyro--
       line 26, "manintained" should be --maintained--
       line 54, "The servo system..." should not begin a new paragraph Claim 5, line 6, "from aid" should be --from said--

Signed and Sealed this

Seventh Day of June 1977

[SEAL]

Attest:

RUTH C. MASON
*Attesting Officer*

C. MARSHALL DANN
*Commissioner of Patents and Trademarks*